July 22, 1969  J. MEDLEY  3,456,837
CONTAINERS
Filed June 12, 1967
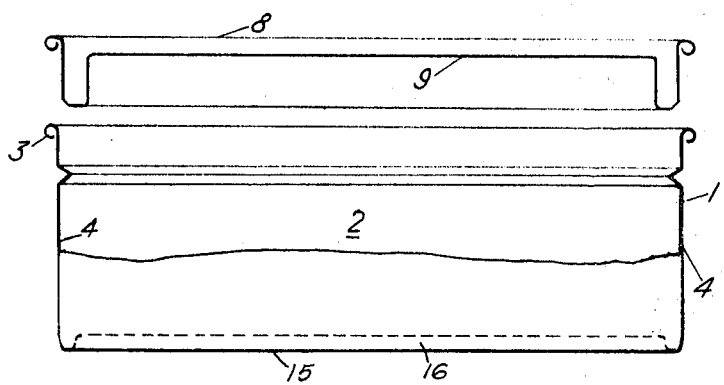
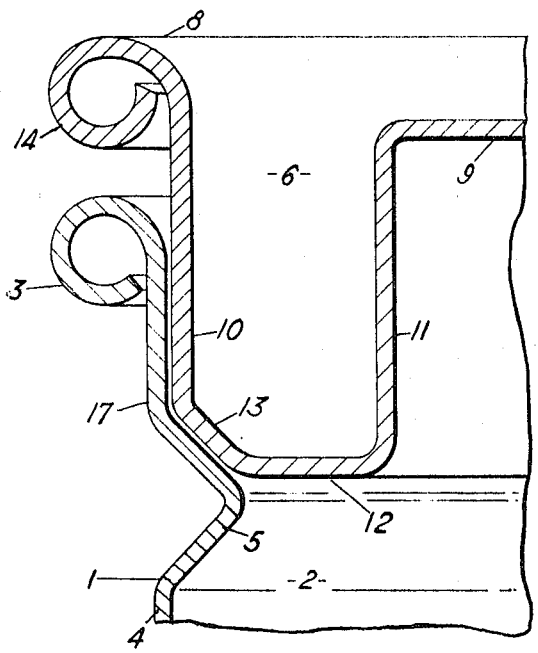
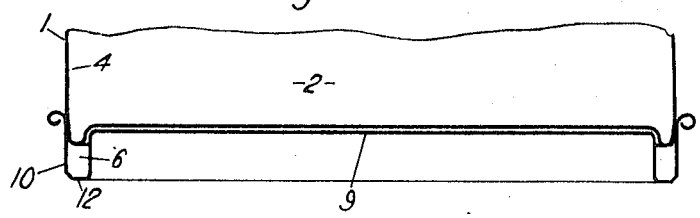
JOSEPH MEDLEY
Inventor
Hall, Pollock
By & Vande Sande
Attorney United States Patent Office 3,456,837
Patented July 22, 1969

3,456,837
CONTAINERS
Joseph Medley, Cwmbran, Wales, assignor to Metalitho Limited, Cwmbran, Monmouthshire, Wales, a British company
Filed June 12, 1967, Ser. No. 645,173
Claims priority, application Great Britain, Nov. 5, 1966, 49,689/66
Int. Cl. B65d *43/04*
U.S. Cl. 220—43      2 Claims

ABSTRACT OF THE DISCLOSURE

The disclosure relates to an air-tight container having a body portion and a frictionally engaging lid. A sidewall of the container body has an inwardly projecting portion against which a downwardly and inwardly projecting portion of the lid abuts so as to provide a positional relation between the lid and the body portion enabling a coin or the like to be inserted between the lid and the body and be turned so as to lift the lid.

---

One of the problems which have faced manufacturers of containers and more especially containers for materials which evaporate comparatively rapidly, for example such materials as polishes for automobile bodies, is to provide a lid which can be opened easily by means of a coin or similar implement while the lid must be able effectively to close the mouth of the container.

It is one object of the invention to provide a container having the desirable qualities recited above.

It is a further object of the invention to provide a container which can be stacked easily and safely on other like containers.

According to the invention, a container for wax polishes and other materials which evaporate quickly has a lid and a body provided with a side wall having an inwardly extending projection engageable by a part of the lid which is adapted to project downwards into the body when the lid is in the closed position, the disposition of the said interengaging projection and lid part being such as to determine a positional relation, between the edge of the lid and the top edge of the said wall, which will enable a coin to be inserted between the lid and the body and to be turned to lift the lid.

According to a further feature of the invention, the projection on the side wall of the body is formed by a continuous internal bead which is adapted to provide a seat for the lid portion which engages it.

According to a still further feature of the invention, the portion of the lid which is arranged to bear on the projection on the side wall is disposed at the lower end of the downwardly extending annular lid surface which, in normal manner, bears on the inner surface of the side wall of the body to close the container, the said downwardly extending portion of the lid being formed with an inclined surface which is adapted to bear on the said bead to increase the ability of the lid to seal the container.

The invention is illustrated by way of example in the accompanying drawings of a container for automobile wax polishes. In the drawings:

FIG. 1 is an exploded view,

FIG. 2 is a fragmentary sectional elevation of the container of FIG. 1, and

FIG. 3 is a somewhat diagrammatic fragmentary view showing a container stacked on another.

Referring to the accompanying drawings, a container 1 is formed with a one-piece solid drawn cylindrical metal body 2 having an external curl or bead 3 at the upper edge of its side wall 4. A continuous internal rib 5 is formed in the side wall 4, this bead being located at a position determined in association with a downwardly extending annular channel 6 formed in the container lid 7. This channel 6 is located at the edge 8 of the lid and extends below both the said edge and the central portion 9 of the lid which is thus of the kind known as a flush top lid. The side wall 10 of the channel nearer the lid edge is of cylindrical form and bears, in normal manner, on the inner surface of the cylindrical side wall 17 of the body above said rib 5, when the lid is in its closed position and at its lower end joins the other parallel wall 11 of the channel via a portion 12 which provides an inclined surface 13 which is adapted to seat on and form a seal with the upper surface 15 of the internal bead 5 on the body. There are thus provided parallel cylindrical surfaces 10, 17, and additional surfaces 13, 5 on the lid and body which interengage to close and seal the container. The position of the said rib 5 is such that the edge 8 of the lid, which also has an external curled bead 14, is, in the closed condition of the lid, vertically spaced above the bead at the upper edge of the side wall of the body so that a coin, for example a penny, can be inserted between the said edges and turned to prise the lid open FIG. 2 shows clearances between the surfaces, for clarity only.

The bottom 15 of the container body 2 is recessed at 16 so as to facilitate the stacking of a number of containers, as illustrated in FIG. 3. The periphery of the container bottom 15 enters partly into the parallel vertical-sided channel 6 in the lid of the container below.

I claim:

1. A container for polishes or other evaporative substances, comprising a one-piece metal body having a side wall and a base, the side wall being formed with a continuous internal annular rib spaced below the upper edge thereof, and an outwardly curled bead at said upper edge, the part of said side wall between said rib and bead being cylindrical, and a press-in lid for closing the mouth of said body, the lid having a cylindrical side wall adapted to make close sealing engagement with said cylindrical part of the side wall of the body, an inturned annular part at the lower edge of said cylindrical side wall of said lid adapted to seat on and form a further seal with said internal rib, and an outwardly curled bead at the upper edge of said cylindrical side wall of said lid, said bead on said lid being spaced vertically above said bead on said body when said lid is in position engaging said internal rib, said lid and the base of said body being formed to be capable of nesting or stacking with the base of one container received in the lid of a lower container.

2. A container according to claim 1, wherein said lid has a central plane portion raised above the lower edge of the cylindrical side wall of said lid and connected thereto by wall means, affording a parallel vertical-sided circumferential channel in said lid immediately adjacent said curled bead on said lid.

References Cited

UNITED STATES PATENTS 2,251,808    8/1941    Rutkowski ---------- 220—43

FOREIGN PATENTS 45,450    9/1935    France.

JAMES B. MARBERT, Primary Examiner